United States Patent
Hotz et al.

(10) Patent No.: US 7,933,833 B2
(45) Date of Patent: Apr. 26, 2011

(54) METHOD AND SYSTEM FOR RAPID LOAN APPROVAL

(75) Inventors: Stephen Hotz, Marietta, GA (US); Jennifer Kelly, Atlanta, GA (US); Krishnamoorthy Srinivasan, Marietta, GA (US); Ajay Kumar Jindia, Smyrna, GA (US)

(73) Assignee: Compucredit Intellectual Property Holdings Corp. II, Las Vegas, NV (US)

(*) Notice: Subject to any disclaimer, the term of this patent is extended or adjusted under 35 U.S.C. 154(b) by 430 days.

(21) Appl. No.: 11/469,467

(22) Filed: Aug. 31, 2006

(65) Prior Publication Data

US 2008/0059363 A1  Mar. 6, 2008

(51) Int. Cl.
*G06Q 40/00* (2006.01)

(52) U.S. Cl. ............. 705/38; 705/1; 705/14; 705/26; 705/35; 705/37; 705/39; 705/42; 705/45; 705/50; 705/64; 235/379; 463/42; 707/10; 709/204

(58) Field of Classification Search ............. 705/1, 14, 705/26, 35, 37, 38, 39, 42, 45, 50, 64; 235/379; 463/42; 707/10; 709/204
See application file for complete search history.

(56) References Cited

U.S. PATENT DOCUMENTS

| | | | | |
|---|---|---|---|---|
| 5,326,960 A * | 7/1994 | Tannenbaum | | 235/379 |
| 5,350,906 A * | 9/1994 | Brody et al. | | 235/379 |
| 5,940,811 A | 8/1999 | Norris | | |
| 6,105,007 A | 8/2000 | Norris | | |
| 6,648,222 B2 | 11/2003 | McDonald et al. | | |
| 6,901,384 B2 | 5/2005 | Lynch et al. | | |
| 7,006,993 B1 * | 2/2006 | Cheong et al. | | 705/38 |
| 2001/0037367 A1 * | 11/2001 | Iyer | | 709/204 |
| 2002/0022966 A1 * | 2/2002 | Horgan | | 705/1 |
| 2002/0032662 A1 * | 3/2002 | Maclin et al. | | 705/64 |
| 2002/0138418 A1 | 9/2002 | Zarin et al. | | |

(Continued)

FOREIGN PATENT DOCUMENTS

GB  2377314 A  *  1/2003

OTHER PUBLICATIONS http://www.pdlloans.com/index.php === already submitted by the Applicant with IDS filed on Aug. 31, 2006.*

(Continued)

*Primary Examiner* — Ella Colbert
*Assistant Examiner* — Sanjeev Malhotra
(74) *Attorney, Agent, or Firm* — Chason A. Carroll; Philip H. Burrus, IV

(57) ABSTRACT

A method and apparatus for rapidly and remotely providing temporary credit to a borrower is provided. In one embodiment, a lender uses as one criterion in approving the temporary credit a minimum number of deposits within a predetermined deposit verification time. Upon receipt of a request for credit, which may come either from a prospective borrower or from a merchant upon denial of credit to the prospective borrower, a lender queries a deposit account to determine whether a predetermined minimum number of deposits has been made within a predetermined deposit verification time. The lender may also determine whether each of the deposits exceeds a minimum deposit amount. Where approved, the lender is able to rapidly dispense funds for use by the borrower. In one embodiment, the lender makes these funds available via a pre-paid credit card. The lender is then able to collect principal and interest through electronic withdrawals.

20 Claims, 3 Drawing Sheets

U.S. PATENT DOCUMENTS

| | | |
|---|---|---|
| 2002/0147669 A1 | 10/2002 | Taylor et al. |
| 2002/0165824 A1* | 11/2002 | Micali ............................ 705/50 |
| 2003/0069071 A1* | 4/2003 | Britt et al. ....................... 463/42 |
| 2003/0208438 A1* | 11/2003 | Rothman ........................ 705/38 |
| 2004/0111329 A1* | 6/2004 | Moore ........................... 705/26 |
| 2004/0138976 A1* | 7/2004 | Wang ............................. 705/35 |
| 2004/0210521 A1* | 10/2004 | Crea et al. ..................... 705/40 |
| 2005/0015341 A1* | 1/2005 | Jackson ......................... 705/45 |
| 2005/0015345 A1* | 1/2005 | Yao et al. ....................... 705/64 |
| 2006/0015357 A1* | 1/2006 | Cagan ............................. 705/1 |
| 2006/0041498 A1* | 2/2006 | Hausman et al. ............... 705/37 |
| 2006/0053115 A1* | 3/2006 | Ashby ............................ 707/10 |
| 2006/0080216 A1* | 4/2006 | Hausman et al. ............... 705/37 |
| 2006/0080230 A1* | 4/2006 | Freiberg ......................... 705/39 |
| 2006/0085340 A1* | 4/2006 | Hung et al. ..................... 705/42 |
| 2006/0253320 A1* | 11/2006 | Heywood ....................... 705/14 |
| 2006/0259390 A1* | 11/2006 | Rosenberger .................. 705/35 |
| 2007/0260537 A1* | 11/2007 | Stone ............................. 705/39 |

OTHER PUBLICATIONS http://www.mtvernonfinancial.comlleads/leadform.jsp === already submitted by the Applicant with IDS filed on Aug. 31, 2006.*
http://www.pdlloans.com/index.php.
http://www.mtvernonfinancial.com/leads/leadform.jsp.

* cited by examiner

METHOD AND SYSTEM FOR RAPID LOAN APPROVAL

BACKGROUND

1. Technical Field

This invention relates generally to a method and system for remotely extending credit, and more specifically to a paperless method and system for rapidly approving temporary credit extensions to a customer where the lender and customer are not face-to-face.

2. Background Art

Borrowing money has traditionally been a time-consuming, burdensome process. Extensive paperwork and form completion, combined with a lengthy approval process, make obtaining credit a daunting task. This is especially true for some borrowers who may not have extensive credit histories because they operate primarily on a cash transaction basis. For example, a student who used only cash during college may find himself without even a checking account, yet still in need of temporary credit. Many traditional lenders require detailed credit reports, existing checking accounts, and other indicia of credit worthiness prior to making a loan. Further, even where these financial requirements are in place, the completion of the necessary documents and approvals may take several days. A prospective borrower may have a more immediate need for cash.

In short, traditional, paper-based loans are cumbersome, slow, and are generally limited to those with established financial histories. They are cumbersome in the fact that they require mailing, faxing or otherwise obtaining of numerous documents, including payroll records, checking account statements, credit reports, and the like. They are slow because even approved borrowers may have to wait 72 hours or more prior to being able to access the funds. They are limited in that people who are paid in cash, or people like the college student mentioned above, may not have a sufficiently lengthy financial history to show a prospective lender that they are credit worthy.

There is thus a need for an improved method and system of extending credit that is faster, more convenient, and that offers expanded eligibility over traditional, paper-based systems.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
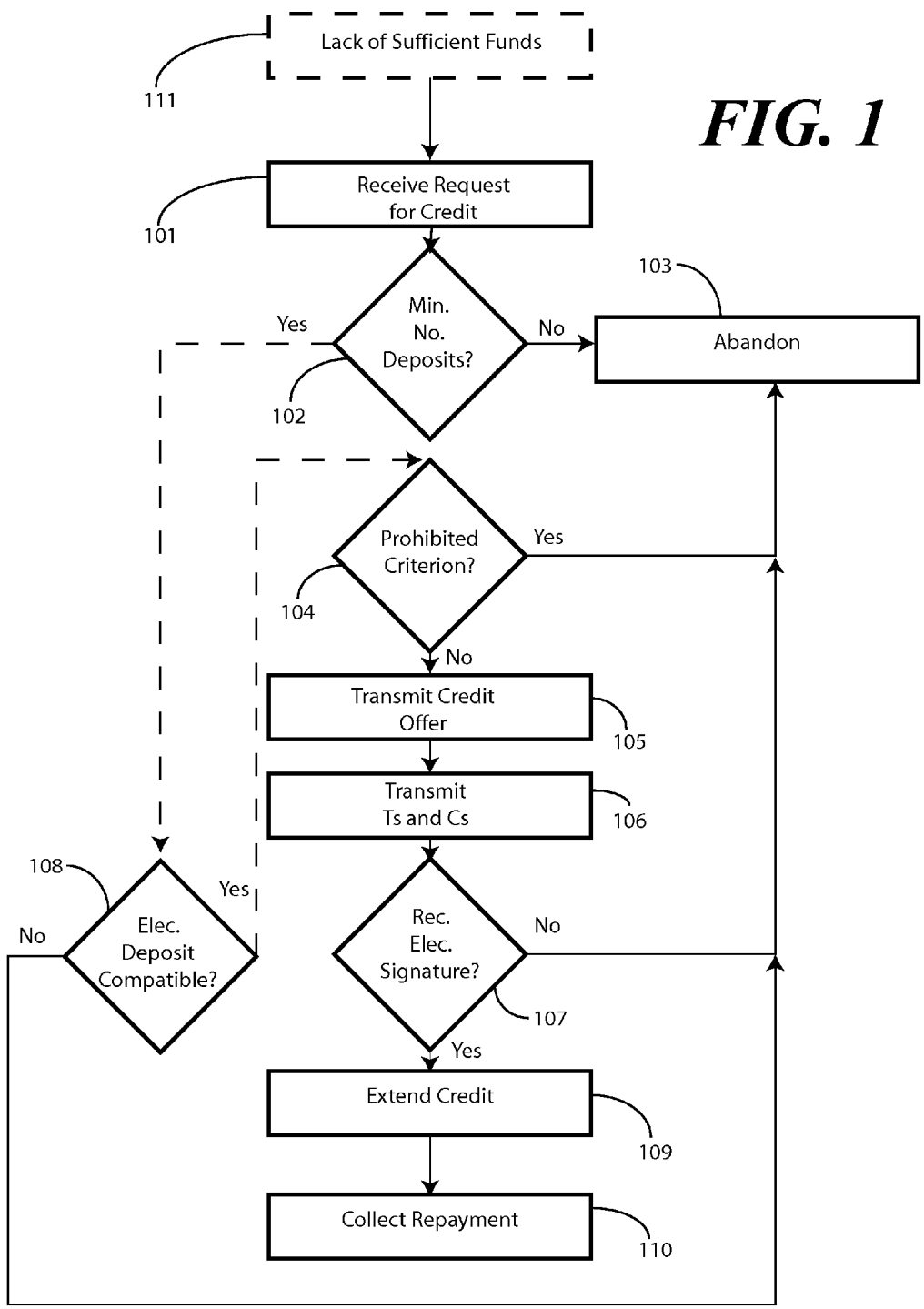
FIG. 1 illustrates one embodiment of a method of extending credit in accordance with the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to a method and system for providing temporary credit. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions, servers, portals, and client terminals that control the one or more modules to implement, in conjunction with certain non-processor components, some, most, or all of the functions of extending credit as described herein. The non-processor components may include, but are not limited to, a web browser, a file server, network communication protocols such as the hypertext mark-up language and hypertext transfer protocol, and user input devices. As such, these functions may be interpreted as steps of a method to perform a temporary extension of credit. Alternatively, some or all functions could be implemented by a machine having no stored program instructions. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and components with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As illustrated and described herein, a method and system for remotely providing temporary credit are provided. In accordance with one embodiment, a temporary line of credit may be applied for and approved to a borrower within minutes, with approval taking a minute or less. Further, the funds may be delivered for use by the borrower within minutes of offer acceptance. In one embodiment, a borrower is provided a credit card, pre-paid card, or debit card having an account associated therewith, with the borrowed credit serving as the pre-paid funding. Repayment may be made in such an embodiment by debiting the account associated with the same pre-paid card. In such an embodiment, it is not necessary for a borrower to have a checking account, as all financial transactions occur through the pre-paid card.

In one embodiment, where a pre-paid card has been in use by the prospective borrower for some brief period of time, the lender may determine whether to extend the temporary line of credit by determining whether a sufficient number of recurring deposits have been made within a predetermined deposit verification time. By way of example, a lender may use as a factor in deciding whether to extend the temporary line of credit whether a prospective borrower has had three electronic deposits of $200 or more within the past 90 days. Other criteria, including whether one of the past three deposits occurred within the past 30 days may also be considered.

In one embodiment, prospective borrowers apply for the temporary line of credit by logging into a lender's network information server through a client terminal. For example, a prospective borrower may access the lender's system through the Internet by a Web browser running on a personal computer. The borrower, in one embodiment, may complete all documentation on-line without the need of submitting any paper. Where the lender is using a predetermined number of deposits exceeding a predetermined amount as acceptance criteria, the lender may instantly verify whether these required deposits have been made. The lender may then approve or disapprove the temporary line of credit in a matter of minutes, bypassing traditional steps such as verifying the existence of a bank checking account, requesting a credit history, report, and so forth.

Once connected to the lender's system, the prospective borrower may enter personal information, including name, address, phone number, pre-paid card number (where one exists), line of credit duration and line of credit amount. The lender's system may populate other fields based on the initial information provided by the prospective borrower. Once this information is verified, the prospective borrower submits the application to the lender for processing.

In addition to a predetermined number of deposits within a predetermined time, the lender may use other criteria to determine whether to extend the temporary line of credit to the prospective borrower. For instance, the lender may want to ensure that one or more prohibitive criteria has not been met by the prospective borrower. By way of example, if the prospective borrower has other outstanding loans, or if the prospective borrower has settled another loan for an amount less than the amount owed, the lender may elect not to extend the temporary line of credit.

Where the borrower is approved for the temporary line of credit, in one embodiment, the borrower must submit an electronic signature to accept the loan. In addition to authorizing transfer of the funds, in one embodiment the electronic signature allows the lender to electronically withdraw the funds at a time certain without further transaction-specific authorization from the user. This electronic withdrawal may be executed by initiating a debit entry in an Automated Clearing House network, or by way of a remote check creation process. The debit entry may include both principal and interest, and may include a service fee or other related fee.

Where the borrower is using a pre-paid card, the lender may approve the funds for immediate use by way of the pre-paid card. In such an embodiment, rather than the borrower having to wait for a check to be mailed, deposited, and cleared, the borrower has instant access to the borrowed funds by way of the pre-paid card. Thus, in emergency situations, the borrower may apply for, be approved for, and have access to a temporary line of credit within minutes.

Turning now to FIG. 1, illustrated therein is one embodiment of a method for extending a temporary line of credit to a customer. At step 101, a lender receives a request for the temporary line of credit from a customer or prospective borrower. The request may be received in a variety of ways. For example, a prospective borrower may submit an application via a storefront or kiosk, over the telephone, or via a network such as the Internet through a client terminal. Where the request is submitted through a web browser, in one embodiment the user enters rudimentary personal information pre-paid card account information, or combinations thereof, and then applies for the credit by clicking a single button. The prospective borrower may also have the option of requesting a selected amount of credit during the application process.

In one embodiment, the request may be received from a point of sale upon, for instance, a rejection of a customer for a purchase as indicated at step 111. For example, where a customer using a pre-paid card issued by the lender is attempting to make a purchase that exceeds the pre-paid spending limit, either the merchant or the customer may transmit a request for a temporary line of credit to the lender. The merchant may transmit the request through a merchant terminal, for example integrated with the cash register. The customer may submit the request through a networked communication device, such as a mobile telephone or personal digital assistant. In such an embodiment, the approval of the request will be done remotely, which means that an issuer of the card, or another third party lender, either of whom is not the merchant, will ultimately decision the request, and where approved, extend credit.

In one embodiment, the request is received in response to an invitation from the lender. For example, the lender may periodically review an amount of funds available for its customers. If customer A has only $20 in available funds, then to assist customer A in making purchases, in one embodiment, the lender determines the available amount of funds, and where the available amount of funds is below a predetermined threshold, transmits an invitation for the temporary line of credit to the customer.

Where such an invitation is employed, amount of credit available is but one triggering mechanism available to the lender for transmitting the invitation. In another embodiment, the lender may review a purchase history of the customer. In reviewing the purchase history, the lender may be able to anticipate future purchases. For instance, where the customer has purchased dinner plates, salad plates, and dessert plates, the lender may anticipate the customer purchasing soup bowls to go with this dinnerware. As such, and perhaps where the customer does not have sufficient funds to acquire the soup bowls, the lender may transmit an invitation to the customer for a short term line of credit to cover the cost of the soup bowls. Thus, in one embodiment, the lender reviews the purchase history to determine an anticipated purchase, and where credit available is insufficient to make the anticipated purchase, transmits an invitation for a temporary line of credit to the customer.

At decision 102, in accordance with one embodiment of approving the temporary line of credit, the lender verifies that at least a minimum number of deposit transactions have occurred in a deposit account belonging to the customer, and that the deposits have occurred within a predetermined deposit verification time. For example, in one embodiment, the lender verifies that at least three deposit transactions have occurred within the most recent 90-day period. In one embodiment, the minimum number of deposit transactions may need to each be greater than a minimum deposit amount. The minimum deposit amount may be related to the amount of credit requested.

Note that as used herein, the lender may be the original card issuer or account provider, or it may be a third party. By way of example, where a customer has a card issued by a bank, that bank is the issuer of the card. Where the card has available funds that are insufficient for purchase, either the issuer may act as the lender for the additional amount of credit, or a third party may. A third party may serve as the lender for only the additional amount of credit. In such scenarios, the third party, acting as the lender, may receive account information, including available funds and deposit or transaction information, from the issuer.

Where the customer has a deposit account, the method may optionally proceed to decision 108. At decision 108, the lender may require that the deposit account belonging to the borrower, be it a conventional checking account or an account associated with a pre-paid card issued by the lender, be configured to receive electronic deposits. Such verification may be necessary due to the paperless nature of one embodiment of the invention. In the paperless embodiment, the lender may elect to transfer funds to the user by way of a electronic deposit. In such a scenario, the lender needs to ensure that the borrower's account is configured to receive electronic deposits. Further, in one embodiment the lender uses a predetermined number of deposits as one criterion regarding whether to extend the temporary line of credit. The borrower's account must be configured to receive electronic deposit transactions in such a scenario. Where this optional step is omitted, the method proceeds directly from decision 102 to decision 104.

Where the customer has a deposit account, such as a checking account or an account, the lender may verify that a minimum number of deposit transactions have occurred within the past 30, 60, or 90 days. Where the customer uses a pre-paid card issued by the lender, the lender may determine whether a minimum number of deposits have been applied to the pre-paid card account. These deposits may need to each exceed a minimum deposit amount.

Where the minimum number of deposits has not been made, or where the minimum deposit amount has not been exceeded with the minimum number of deposits, the lender may deny the temporary line of credit at step 103. Where the minimum number of deposits has been made, and where the minimum deposit amount has been exceeded with each of the deposits, the method moves to decision 104.

At decision 104, the lender verifies whether the prospective borrower has not met at least one prohibitive criterion. Examples of prohibitive criteria include the existence of an outstanding loan, the existence of a discounted credit repayment, and the existence of a payment due for more than a predetermined payment due period. Where other outstanding loans exist, the lender may not want to extend further credit to the borrower. Thus, the temporary line of credit may be denied at step 103. Where the borrower has "charged off" a recent loan, i.e. where the borrower has paid less than the full amount due to extinguish a loan, the lender may elect to deny the temporary line of credit at step 103. Where the borrower has not made recent payments for other obligations in a timely fashion, the lender may also elect not to extend the temporary line of credit at step 103. Other examples of prohibited criteria include no permanent disqualification factors associated with the prospective borrower, no adverse external factors associated with the prospective borrower, and ensuring that the prospective borrower meets state residency requirements.

Where one of the prohibited criteria has not been met, the lender may extend a temporary line of credit offer to the prospective borrower. This offer may be delivered to the prospective borrower in a variety of ways. As noted above, in one embodiment, the method of the present invention is paperless. As such, the offer may be transmitted to the prospective borrower by any of an e-mail message, a telephone call, a text message, a multi-media message, or data message. These messages may be delivered to any of a personal computer, mobile telephone, personal digital assistant, portable computer, or other similar device.

At step 106, the lender may elect to transmit terms and conditions to the prospective borrower. The terms and conditions may include a provision indicating that payments for principal, interest, and service charges may be made automatically. In one embodiment, the automatically withdrawn payments may be executed within a predetermined window about a scheduled deposit. For example, the lender may schedule an automatic withdrawal from the borrower's account between three days prior and three days after an anticipated deposit transaction. This window is referred to herein as the predetermined deposit window.

The terms and conditions may include other information as well. For example, the terms and conditions may indicate that the temporary line of credit process will occur electronically. The terms and conditions may also set forth any hardware or software requirements required of the borrower to properly process the temporary line of credit. The terms and conditions may further include the terms of withdrawal or cancellation by either the lender or the borrower. The terms and conditions may include a privacy statement, and may indicate that all financial transactions will occur electronically.

One requirement of the terms and conditions, as noted above, may be an electronic signature so that line of credit funds may be transferred. The electronic signature may also allow the lender to automatically withdraw funds from the borrower's account. Where this is a requirement, the lender checks to see whether the electronic signature is received at decision 107. Where it has not been, the lender may deny the temporary line of credit at step 103. Where the electronic signature is a requirement and is received, the method moves to optional step 109.

At step 109, the lender extends credit to the borrower. As the method may be executed paperlessly, the lender is able— in one embodiment—to approve the temporary line of credit very rapidly. Experimental results have shown that the elapsed time between the step of receiving a request for the temporary line of credit from the customer (step 101) and the step of extending the temporary line of credit offer (step 105) can occur in under 60 seconds.

The amount of credit offered can vary. For example, in one embodiment, the borrower is provided with a predetermined list of credit amounts, such as $100, $200, and $500. In another embodiment, the borrower may request a specific amount of credit. In yet another embodiment, the temporary line of credit includes a temporary credit amount selected by the lender. The temporary credit amount may be based upon a variety of factors, including the amount of time the borrower has been affiliated with the lender, the amount of money deposited in the borrower's deposit account, or an absolute or average balance maintained in the borrower's deposit account. In one embodiment, the determination of the temporary credit amount depends upon a deposit history within the deposit account. The deposit history may include a minimum deposit amount made by either the borrower or through one of the direct deposit transactions.

Once the temporary line of credit has been extended, the lender must collect payments of principal and interest from the borrower. At step 110, the lender collects a repayment amount from the borrower's deposit account within the predetermined deposit window. As indicated above, this collection of the repayment amount may occur via an automated electronic withdrawal approved with the borrower's electronic signature.

Figure 2:
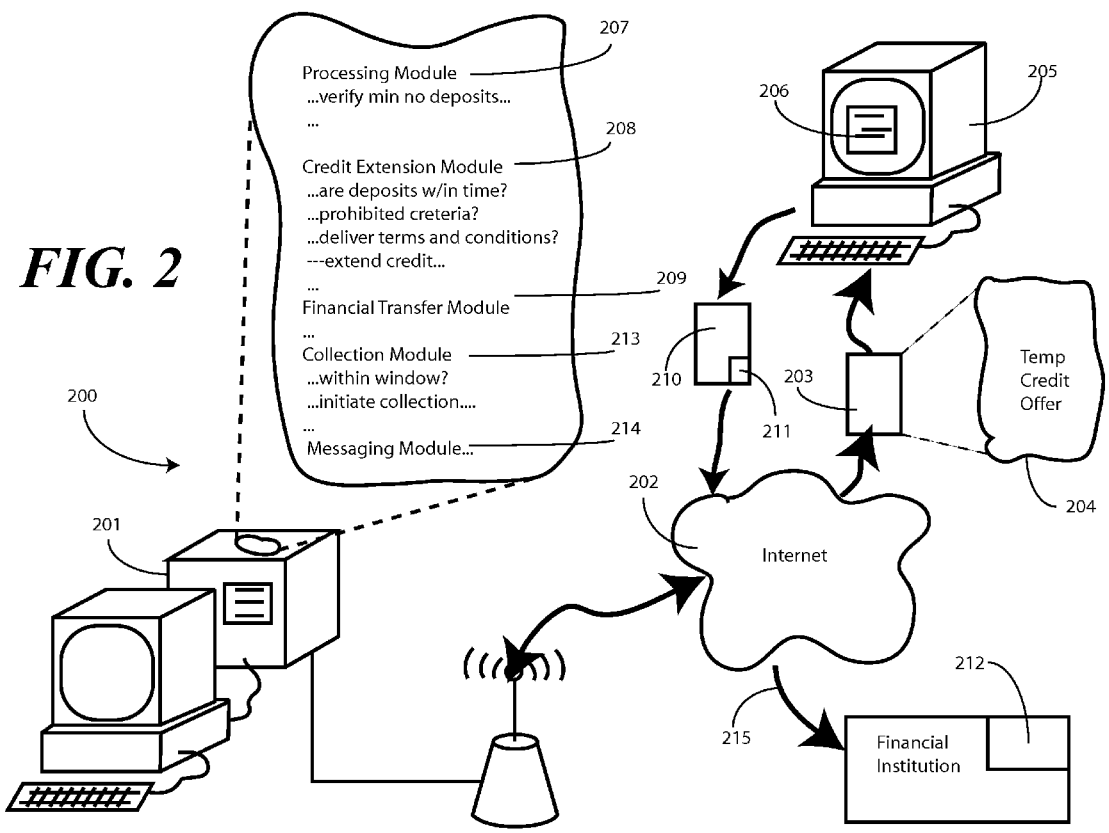
FIG. 2 illustrates one embodiment of a system for extending credit in accordance with the invention.

Turning now to FIG. 2, illustrated therein is one embodiment of a system 200 for extending temporary credit to a customer in accordance with the invention. The system includes a network information server 201 configured to deliver browser readable content 203 to a client terminal 205. The client terminal 205, which may be a personal computer, portable computer, or other two-way communication device, includes a browser 206 in communication with a network 202, such as the Internet or World Wide Web.

The network information server 201 is configured to provide a temporary extension of credit webpage 204 to the browser 206 with which a customer or prospective borrower may submit a request 210 for temporary credit. The request 210 for the temporary credit, in one embodiment, includes information 211 identifying a deposit account 212 belonging to the prospective borrower. The customer may make the request 210 by logging into a web page, or by transmitting a message from a portable device, such as a mobile telephone.

A processing module 207, which is operable with the network information server 201, is configured to verify that at least a predetermined number of deposit transactions have occurred within the deposit account 212. The predetermined number of deposit transactions may be required to occur within a predetermined deposit verification time. The processing module 207 verifies the deposits in response to the request 210 for the temporary credit.

A credit extension module 208 operates with the network information server 201 to direct the network information server 201 to extend a temporary credit to the borrower where the predetermined number of deposit transactions has occurred within the predetermined deposit verification time. Where terms and conditions are to be delivered to the prospective borrower, the credit extension module 208 may be configured to direct the network information server 201 to transmit terms and conditions of the temporary credit to the prospective borrower. The terms and conditions may include a provision requiring the prospective borrower to provide an authorization, perhaps as an electronic signature, authorizing the lender to make electronic, automated withdrawals from the borrower's deposit account 212 within the predetermined deposit time window.

A financial transfer module 209 is configured to cause funds to be transferred from the lender to the borrower's deposit account. This transfer may occur via a communications link 215 between the financial transfer module 209 and the deposit account 212. A collection module 213 is then configured to automatically collect a payment amount from the deposit account within a predetermined deposit time window.

A messaging module 214 is configured to transmit a message to the prospective borrower directing the prospective borrower to the temporary extension of credit webpage 204. The message may include an eligible amount of credit for which the prospective borrower may apply. The message may further identify an eligible account, for example where the prospective borrower has multiple deposit accounts. The message may also include an opt-out provision by which the prospective borrower may be omitted from receiving such messages.

The messaging module 214 may identify prospective borrowers in a variety of ways. As noted in the discussion of the method above, in one embodiment, the temporary extension of credit may be made in response to a customer credit rejection at a point of sale. In such an embodiment, a lender may detect the rejection through a credit approval network. Upon detecting a credit rejection, the lender may transmit to the customer a message directing the prospective borrower to the temporary extension of credit webpage. By way of example, when a person attempting to purchase $100 worth of goods only has $80 worth of available funds, the original lender, accountant provider, or a merchant upon receiving this information from a lender, may reject this sale. A lender, detecting this rejection, may transmit through the messaging module 214 an electronic mail message to the person's mobile telephone. This electronic mail message may direct the person to an extension of credit webpage accessible through the mobile phone.

In other embodiments, a lender issuing pre-paid cards may identify and notify customers by mining eligible accounts. The lender may check the accounts for a number of deposits and deposit amounts to see if the person holding the account is eligible for a temporary extension of credit. The lender may check anticipated payment dates or payment amounts in determining whether to have the messaging module 214 transmit a message directing a prospective borrower to the temporary extension of credit webpage 204.

As the various modules work in tandem, in some embodiments, an approval and offer of credit may occur very rapidly. For example, in one embodiment, the elapsed time within which the processing module 207 verifies that the predetermined number of deposit transactions have occurred within the predetermined deposit verification time, the credit extension module 208 directs the network information server 201 to extend a temporary offer of credit, and the financial transfer module 209 causes funds to be deposited within the deposit account 212 is less than 60 seconds. In one embodiment this elapsed time is reduced because the lender uses an account associated with a pre-paid credit or debit card as the borrower's deposit account. Having visibility of that deposit account, the lender is able to quickly determine whether the required number of deposits and amounts have occurred within that account.

Figure 3:
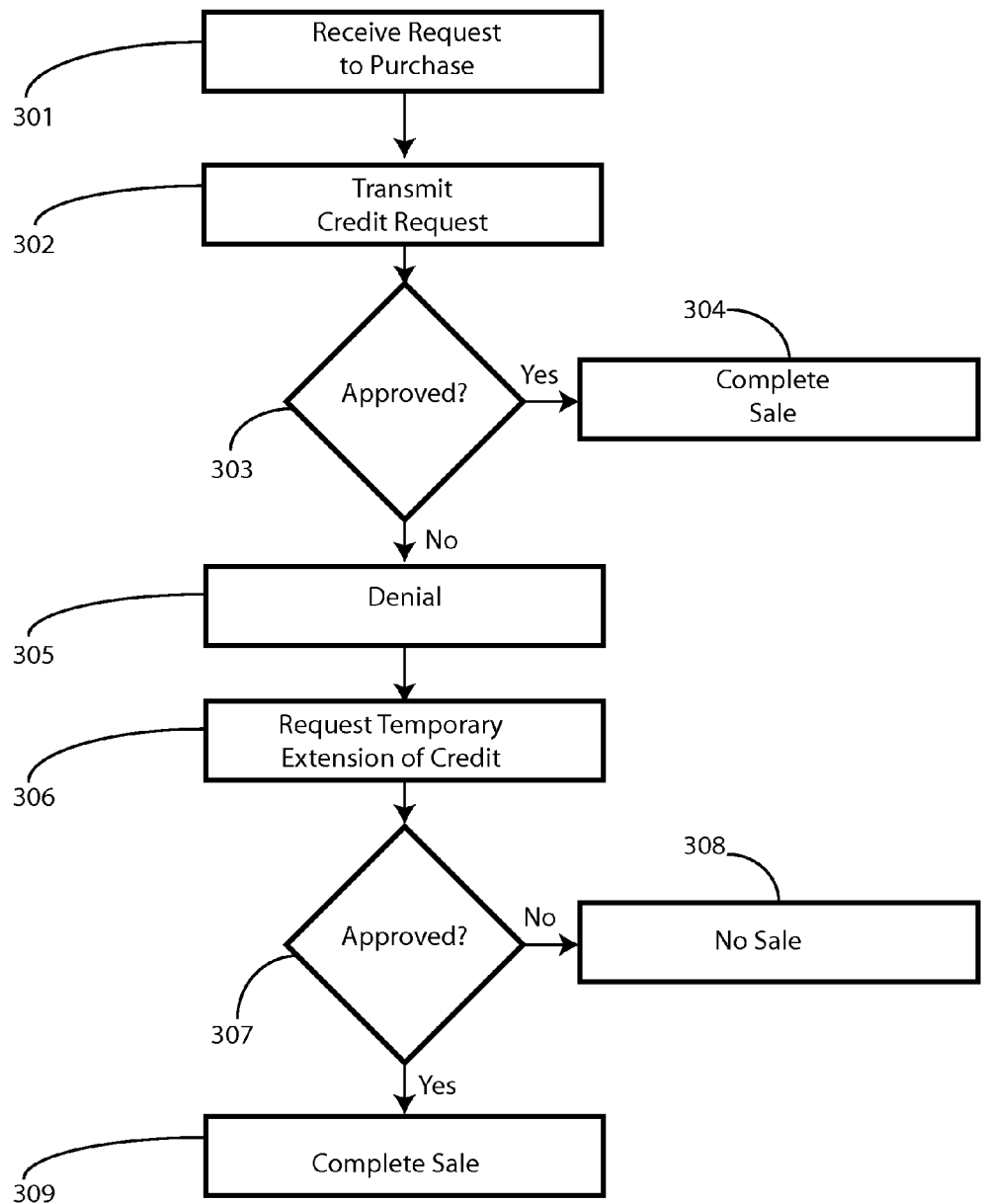
FIG. 3 illustrates one embodiment of a method of extending credit in accordance with the invention.

As noted above, in one embodiment, the identification of a prospective borrower may occur when a person is denied a purchase for lack of funds or credit at a point of sale. Turning now to FIG. 3, illustrated therein is one method of extending a temporary line of credit in accordance with this scenario. At step 301, a party such as a merchant receives a request to purchase goods, services, or both. Assuming for the moment that the prospective purchaser is attempting to pay with a non-cash means, such as a credit or debit card, at step 302 the merchant transmits a credit authorization request for the pending purchase.

At decision 303, the merchant determines whether the prospective purchaser has sufficient financial resources to complete the purchase by receiving an authorization or denial from the lender. Where this is the case, the sale is completed at step 304. Where the prospective purchaser has either insufficient funds for the debit card or insufficient credit for the credit card, the merchant receives a denial of credit authorization at step 305.

Embodiments of the method and system as described herein may then be used to allow the prospective purchaser to still complete the purchase. Specifically, a lender using embodiments of the invention may decide to extend temporary credit to the prospective purchaser in an amount sufficient to enable the prospective purchaser to complete the transaction. To do so, at step 306, either the merchant or prospective purchaser transmits a request for a temporary line of credit on behalf of the prospective purchaser. This request may be sent from a merchant terminal, such as a cash register or credit authorization terminal. Alternatively, it may be sent from the purchaser by way of a mobile telephone or personal digital assistant. Further, the request may be in response to an electronic message sent from a lender detecting the denial of credit that occurred at step 305.

At decision 307, a lender determines whether to extend a line of credit to the prospective borrower. This decision may be made in accordance with the method of FIG. 1, or through the system of FIG. 2. In one embodiment, the decision may be based upon a predetermined number of deposit transactions occurring in a deposit account belonging to the prospective purchaser within a predetermined deposit verification time. Further, one or more of the deposits may need to exceed a predetermined deposit amount.

Where the temporary credit is not approved, the prospective sale may be terminated at step 308. Where the lender extends the temporary credit, the sale may be completed at step 309. As the method of FIG. 3 may be completed paperlessly, it may be completed in a much shorter time than conventional, paper-based systems. Experimental testing has shown that in one embodiment, the duration between the step of transmitting the request for the temporary line of credit on behalf of the customer and the step of receiving an authorization for the temporary line of credit is less than 60 seconds. This time is decreased further where the lender is also the issuer of a credit or debit card associated with the deposit account, as the lender is able upon receipt of the request for credit to query the deposit account associated with the card for the minimum number of deposit transactions or deposit amount. Further, in this scenario, the lender is able to transfer the funds directly to the deposit account associated with the card for immediate use by the borrower via the card. The lender is also able to collect payments by electronically withdrawing principal and interest from the deposit account associated with the card.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention.

What is claimed is:

1. A method, operable with one or more processors, to control the one or more processors to execute a method for extending a temporary line of credit to a customer, the method comprising:
   receiving a request for the temporary line of credit from the customer;
   verifying, with a processing module operable with the one or more processors, at least a minimum number of deposit transactions have occurred in a deposit account belonging to the customer within a predetermined deposit verification time;
   verifying, with the one or more processors, that at least one prohibitive criterion has not been met by the customer;
   extending, with a credit extension module operable with the one or more processors, the temporary line of credit to the customer only where the at least a minimum number of deposit transactions have occurred in the deposit account within the predetermined deposit verification time;
   collecting, with a collection module operable with the one or more processors, a repayment amount from the deposit account within a predetermined deposit time window;
   transmitting electronically temporary line of credit terms and conditions to the customer; and
   receiving an electronic signature authorizing an automated withdrawal from the deposit account.

2. The method of claim 1, wherein an elapsed time between the step of receiving the request for the temporary line of credit from the customer and the step of extending the temporary line of credit to the customer is less than sixty (60) seconds.

3. The method of claim 1, prior to the receiving the request for the temporary line of credit, further comprising transmitting a temporary credit line extension offer to the customer by one of e-mail, telephone, data message and multimedia message.

4. The method of claim 3, wherein transmitting the temporary credit line extension offer is triggered by a third party credit rejection received by the customer.

5. The method of claim 1, wherein the at least one prohibitive criterion is selected from the group consisting of an existence of an outstanding loan, an existence of a discounted credit repayment, and an existence of a payment due for more than a predetermined payment due period.

6. The method of claim 1, wherein the method is paperless.

7. The method of claim 1, wherein the minimum number of deposit transactions comprises at least three deposit transactions, further wherein the predetermined deposit verification time is less than ninety (90) days.

8. The method of claim 7, wherein the extending a temporary line of credit to the customer occurs only where each of the minimum number of deposit transactions is for an amount greater than a minimum deposit amount.

9. The method of claim 8, wherein the temporary line of credit comprises a temporary credit amount, wherein a determination of the temporary credit amount depends from a deposit history within the deposit account.

10. The method of claim 9, wherein the deposit history comprises the minimum deposit amount.

11. The method of claim 1, wherein the predetermined deposit time window comprises a period running from three days prior to a deposit transaction through three days after the deposit transaction.

12. The method of claim 1, wherein the extending a temporary line of credit to the customer occurs only where the deposit account is configured to receive direct deposit transactions.

13. The method of claim 1, further comprising:
   determining an available amount of credit; and
   wherein the available amount of credit is below a predetermined threshold, transmitting an invitation for the temporary line of credit to the customer.

14. The method of claim 1, further comprising:
   reviewing a purchase history to determine an anticipated purchase; and
   where an available amount of credit is insufficient to make the anticipated purchase, transmitting an invitation for a temporary line of credit to the customer.

15. A system for extending temporary credit to a customer, the system comprising:
   a. a network information server configured to deliver browser readable content to a client terminal having a browser in communication with the Internet, the network information server providing at least a temporary extension of credit webpage to the browser with which the customer may submit a request for a temporary extension of credit, wherein the request for the temporary extension of credit includes at least information identifying a deposit account belonging to the customer;
   b. a processing module operable with the network information server, the processing module being configured to verify that at least a predetermined number of deposit transactions have occurred in the deposit account, within a predetermined deposit verification time, in response to the request for the temporary extension of credit;

c. a credit extension module operable with the network information server, the credit extension module being configured to direct the network information server to extend a temporary extension of credit to the customer where the predetermined number of deposit transactions have occurred within the predetermined deposit verification time;

d. a financial transfer module operable with the network information server, the financial transfer module being configured to cause funds to be deposited in the deposit account;

e. a collection module operable with the financial transfer module, the collection module being configured to automatically collect a payment amount from the deposit account within a predetermined deposit time window;

f. wherein the credit extension module is configured to direct the network information server to transmit terms and conditions of the temporary extension of credit to the browser; and g. wherein the terms and conditions include a provision providing an authorization from the customer for an electronic automated withdrawal from the deposit account within the predetermined deposit time window.

16. The system of claim 15, wherein an elapsed time within which the processing module verifies that the predetermined number of deposit transactions have occurred in the deposit account within the predetermined deposit verification time, the credit extension module directs the network information server to extend a temporary offer of credit, and the financial transfer module causes funds to be deposited in the deposit account, is less than sixty (60) seconds.

17. The system of claim 16, further comprising a messaging module operable with the network information server, the messaging module being configured to transmit a message to the customer directing the customer to the temporary extension of credit webpage.

18. The system of claim 16, further comprising a communications link between the financial transfer module and the deposit account.

19. A method for extending a temporary line of credit, the method comprising:
   receiving, at a merchant terminal, a customer request to purchase one of goods and services;
   transmitting, from the merchant terminal, a credit authorization request for the purchase;
   receiving, at the merchant terminal, a denial of the credit authorization request;
   transmitting, from the merchant terminal, a request for a temporary line of credit on behalf of a customer;
   receiving, at the merchant terminal, an authorization for a temporary line of credit upon a verification of a minimum number of deposit transactions in a customer deposit account within a predetermined deposit verification time; and
   completing a sale for the one of goods and services.

20. The method of claim 19, wherein a duration between the step of transmitting the request for the temporary line of credit on behalf of the customer and the step of receiving the authorization for the temporary line of credit is less than sixty (60) seconds.

* * * * *